(12) United States Patent
Inoue et al.

(10) Patent No.: US 8,598,503 B2
(45) Date of Patent: Dec. 3, 2013

(54) PROJECTION DISPLAY APPARATUS WITH A DEVICE TO MEASURE DETERIORATION IN AN ARRAY LIGHT SOURCE

(75) Inventors: Masutaka Inoue, Hirakata (JP); Seiji Tsuchiya, Ootsu (JP); Susumu Tanase, Kadoma (JP); Yoshinao Hiranuma, Hirakata (JP); Takaaki Abe, Osaka (JP); Masahiro Haraguchi, Daito (JP)

(73) Assignee: Sanyo Electric Co., Ltd., Moriguchi-shi (JP)

( * ) Notice: Subject to any disclaimer, the term of this patent is extended or adjusted under 35 U.S.C. 154(b) by 437 days.

(21) Appl. No.: 12/099,374

(22) Filed: Apr. 8, 2008

(65) Prior Publication Data

US 2008/0246927 A1 Oct. 9, 2008

(30) Foreign Application Priority Data

Apr. 9, 2007 (JP) ................ 2007-101775

(51) Int. Cl.
*G01J 1/32* (2006.01)
*G03B 21/20* (2006.01)

(52) U.S. Cl.
USPC ........................................... 250/205; 353/85

(58) Field of Classification Search
USPC ....... 250/205, 214 R, 214.1, 206, 578.1, 221; 353/85–87; 345/207, 690, 214, 63, 76, 345/77, 82–84; 348/744, 602, 603; 349/8–10, 5; 315/149–159
See application file for complete search history.

(56) References Cited

U.S. PATENT DOCUMENTS 7,052,138 B2 * 5/2006 Matsui ............................ 353/31

| | | |
|---|---|---|
| 2004/0227456 A1 | 11/2004 | Matsui |
| 2005/0122481 A1 | 6/2005 | Yamasaki et al. |
| 2005/0162737 A1 | 7/2005 | Whitehead et al. |
| 2006/0139954 A1 | 6/2006 | Kobori et al. |
| 2006/0227085 A1 * | 10/2006 | Boldt et al. ............... 345/83 |
| 2007/0236431 A1 * | 10/2007 | Tada et al. ................ 345/84 |

FOREIGN PATENT DOCUMENTS

| | | |
|---|---|---|
| EP | 1482770 A1 | 12/2004 |
| JP | 09-200662 A1 | 7/1997 |
| JP | 2005-156650 A | 6/2005 |
| JP | 2006-209054 A | 8/2006 |
| JP | 2007-065012 A | 3/2007 |
| WO | WO 02/47438 A2 | 6/2002 |
| WO | WO 02/47438 A3 | 6/2002 |
| WO | WO 2005/111976 A1 | 11/2005 |

* cited by examiner

*Primary Examiner* — Que T Le
*Assistant Examiner* — Jennifer Bennett
(74) *Attorney, Agent, or Firm* — Marvin A. Motsenbocker; Mots Law, PLLC

(57) ABSTRACT

A projection display apparatus includes: a light amount sensor which detects an amount of light emitted from an array light source; a deterioration rate calculator which acquires an amount of light of a measurement target light source from the amount of light detected by the light amount sensor; a reference light amount storage which stores a reference amount of light of an amount of light emitted from plurality of solid state light sources, for each of the solid state light sources; and a light source controller which controls the amount of light emitted from the plurality of solid state light sources for each of the solid state light sources, and the deterioration rate calculator determines whether the measurement target light source has deteriorated, in accordance with a result of a comparison between the amount of light detected by the light amount sensor, and the reference amount of light.

9 Claims, 11 Drawing Sheets

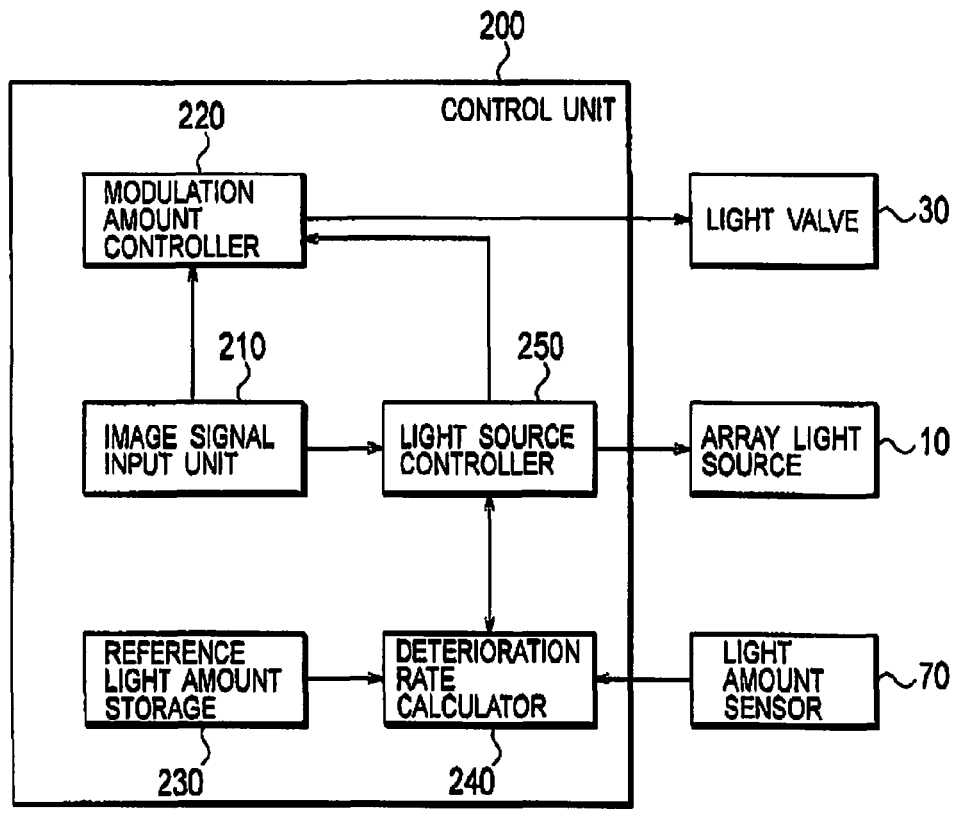
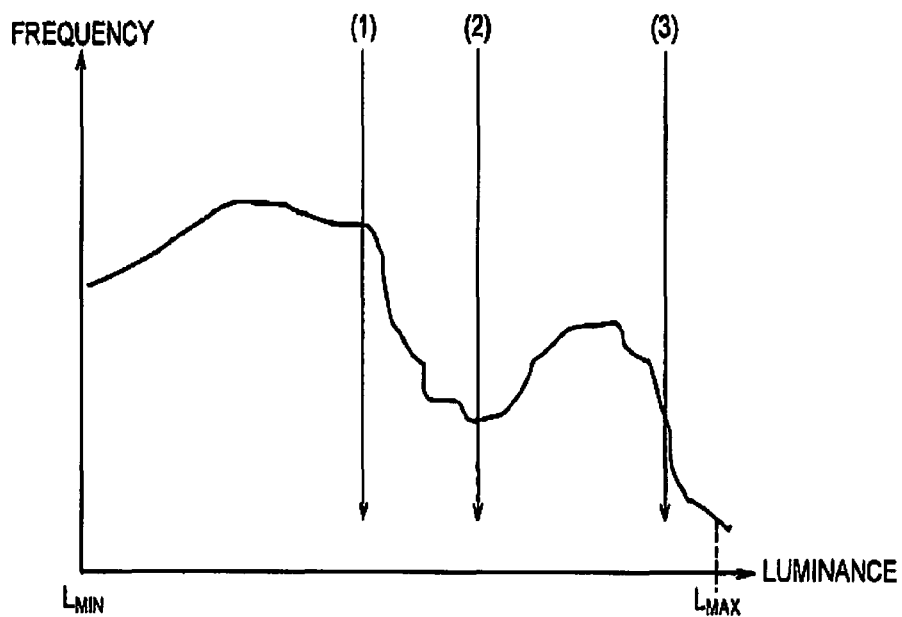

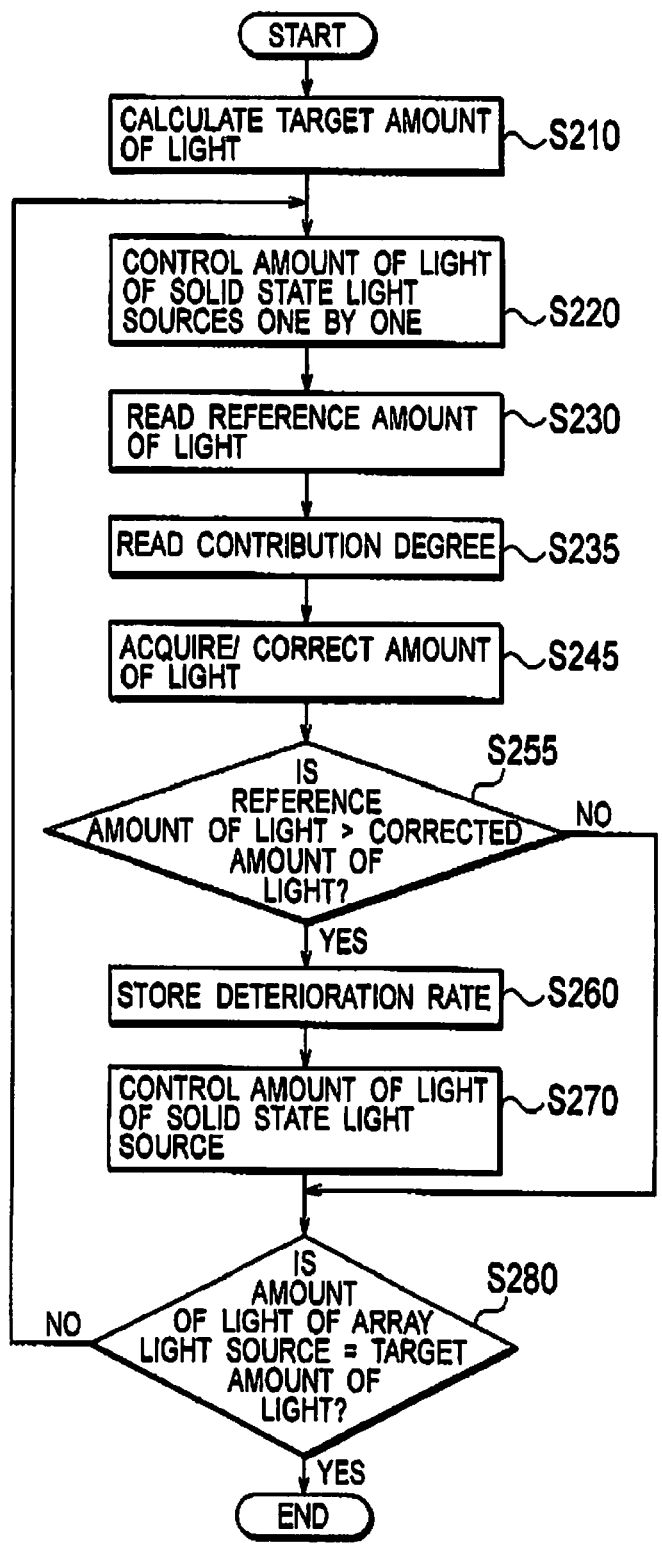

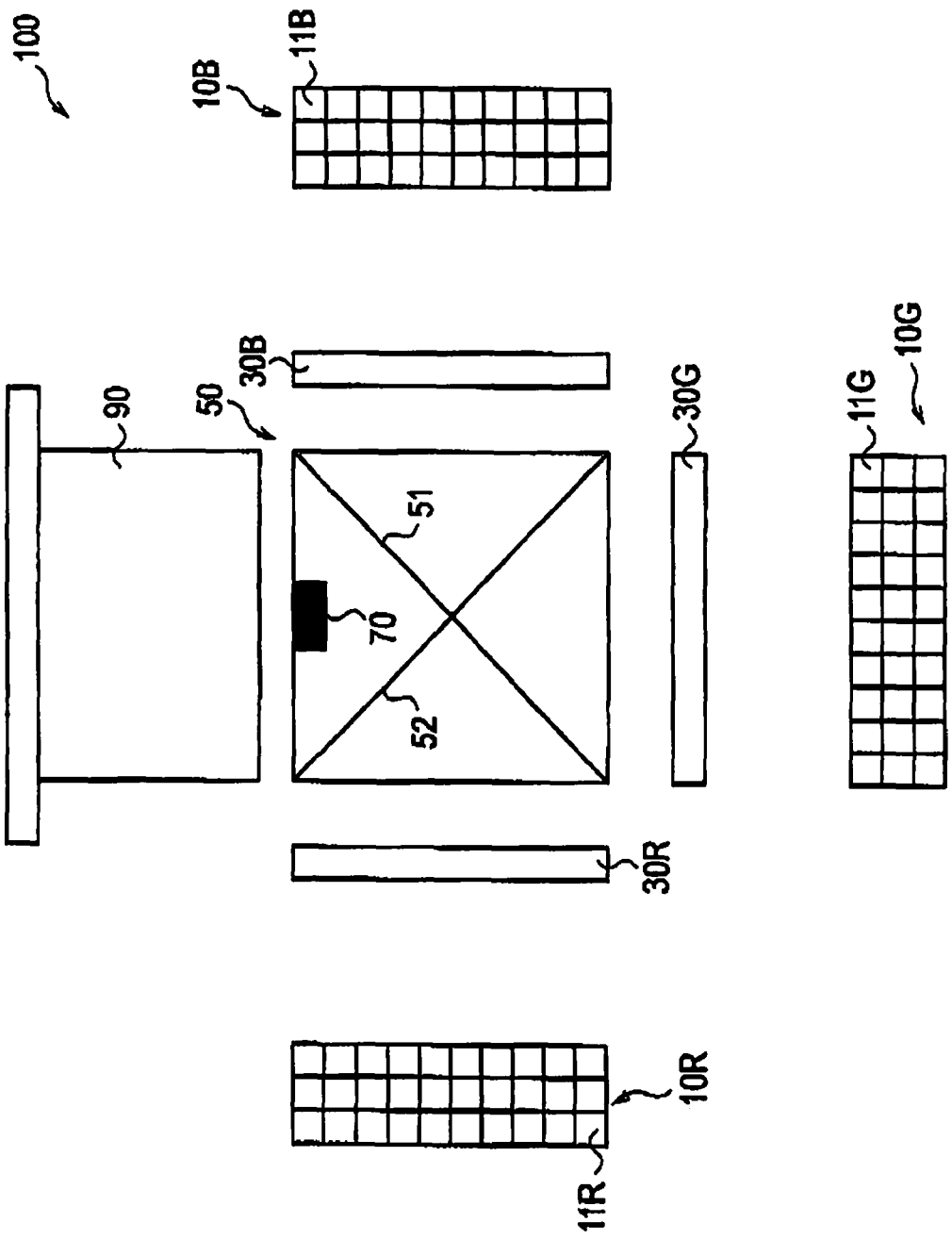

PROJECTION DISPLAY APPARATUS WITH A DEVICE TO MEASURE DETERIORATION IN AN ARRAY LIGHT SOURCE

BACKGROUND OF THE INVENTION

1. Field of the Invention

The present invention relates to a projection display apparatus including an array light source in which plurality of solid state light sources are disposed in an array.

2. Description of the Related Art

Projection display apparatuses have heretofore been known, each of which includes a light valve (a liquid crystal panel or the like) modulating light emitted from a light source. A projection display apparatus projects light modulated by a light valve on a screen. Further, as a light source provided to a projection display apparatus, an attempt has been made to employ a solid state light source such as a laser diode or an LED.

Meanwhile, it is difficult to secure an amount of light necessary for a projection display apparatus only with a single solid state light source. For this reason, in a projection display apparatus, a plurality of solid state light sources are normally disposed in an array.

In the meantime, there is a case that a solid state light source deteriorates due to a change in ambient temperature of a solid state light source. Additionally, there is also a case that the solid state light source deteriorates with time. Thus, when the solid state light source deteriorates, variation occurs in an amount of light emitted from each of the solid state light sources disposed in an array. Accordingly, to prevent the variation of the amount of light emitted from each of the solid state light sources from occurring, it is necessary to detect the deterioration of the solid state light sources.

The following approach has also been disclosed for a case where a plurality of light sources are provided in such a projection display apparatus. In this approach, multiple sensors are provided to correspond respectively to the multiple light sources. Such approach is disclosed, for example, in Japanese Patent Application Publication No. Heisei 09-200662.

In the above-described projection display apparatus, multiple sensors are provided so as to correspond respectively to the multiple light sources. Hence, the number of the sensors increases with an increase in the number of the light sources, and this leads to an increase in the cost of the projection display apparatus. Moreover, with an increase in the number of the sensors, the controls of each of the sensors become complicated.

Further, in the projection display apparatus in which plurality of solid state light sources are disposed in an array, even when multiple sensors corresponding respectively to the plurality of solid state light sources are disposed, it is difficult to detect only light emitted from each of the solid state light sources.

SUMMARY OF THE INVENTION

In a first aspect of the present invention, a projection display apparatus has an array light source (array light source 10) in which a plurality of solid state light sources (solid state light sources 11) are disposed in an array. The projection display apparatus includes: a sensor (light amount sensor 70) provided on a light path of light emitted from the array light source and configured to detect an amount of light emitted from the array light source; an acquisition unit (deterioration rate calculator 240) configured to acquire an amount of light of a measurement target light source which is any one of the plurality of solid state light sources, from an amount of light detected by the sensor; a reference light amount storage (reference light amount storage 230) configured to store a reference amount of light of an amount of light emitted from each of the plurality of solid state light sources; a light source controller (light source controller 250) configured to control the amount of light emitted from each of the plurality of solid state light sources, so that the acquisition unit acquires the amount of light of the measurement target light source; and a determination unit (deterioration rate calculator 240) configured to determine whether or not the measurement target light source has deteriorated, in accordance with a result of a comparison between the amount of light of the measurement target light source acquired by the acquisition unit, and the reference amount of light.

According to the first aspect of the present invention, the light source controller controls the amount of light emitted from each of the plurality of solid state light sources, so that the acquisition unit is able to acquire the amount of light of the measurement target light source. Thus, even when only a single sensor is provided to a single array light source, the deterioration rate of a single solid state light source (a measurement target light source) can be calculated without providing sensors to each of the plurality of solid state light sources.

Hence, even when the plurality of solid state light sources are disposed in an array, the variation of the amount of light emitted from each of the solid state light sources can be suppressed using the deterioration rate calculated for each of the solid state light sources.

Incidentally the disposition of the solid state light sources of the array light source may be of X-shape, cross-shape, circular shape, or of any other shape.

In the above-described aspects, the projection display apparatus farther includes: a contribution degree storage configured to store a contribution degree which is a degree of light reaching to the sensor, the light emitted from each of the plurality of solid state light sources; and a correction unit configured to correct the amount of light of the measurement target light source acquired by the acquisition unit, or the reference amount of light, based on the contribution degree corresponding to the measurement target light source, and that the determination unit determine whether or not the measurement target light source has deteriorated, using a result of a correction made by the correction unit.

In the above-described aspects, the light source controller sequentially controls the amount of light of the solid state light sources one by one, in a turn-on phase turning on the array light source; and the acquisition unit acquires the amount of light of the measurement target light source, in accordance with the amount of light detected by the sensor in the turn-on phase.

In the above-described aspects, the light source controller sequentially controls the amount of light of the solid state light sources one by one, in a turn-off phase turning off the array light source; and the acquisition unit acquires the amount of light of the measurement target light source, in accordance with the amount of light detected by the sensor in the turn-off phase.

In the above-described aspects, the light source controller sequentially controls the amount of light of the solid state light sources one by one, in a back light control switching the amount of light of the array light source in accordance with an image signal; and the acquisition unit acquires the amount of light of the measurement target light source, in accordance with the amount of light detected by the sensor in the back light control.

Here, considering the case where the solid state light source is a laser, a deterioration of the laser is likely to happen due to a change in ambient temperature. In this situation, it is determined whether or not the laser deteriorates when a back light control is performed, that is, when an image is actually displayed. Therefore, the deterioration of the laser due to the change in ambient temperature can also be detected. Thus, this aspect is particularly effective in the case where the solid state light source is a laser. In the above-described aspects, the projection display apparatus further includes: a start position storage configured to store a start position which is a position of the solid state light source of which an amount of light is controlled at a time of starting the back light control; and a start position updating unit configured to update the start position, in accordance with a terminate position which is a position of the solid state light source of which an amount of light is controlled at a time of terminating the back light control.

In the above-described aspects, the projection display apparatus further includes a calculation unit (deterioration rate calculator 240) configured to calculate a deterioration rate of the measurement target light source in accordance with the result of the comparison between the amount of light of the measurement target light source acquired by the acquisition unit, and the reference amount of light. The light source controller controls the amount of light of the solid state light source having a large deterioration rate, prior to the solid state light source having a small deterioration rate, in the back light control reducing the amount of light of the array light source.

In the above-described aspects, the light source controller controls the amount of light of the solid state light source having a small deterioration rate, prior to the solid state light source having a large deterioration rate, in the back light control increasing the amount of light of the array light source.

BRIEF DESCRIPTION OF THE DRAWINGS

FIG. 7 is a block diagram showing a configuration of a control unit 200 of a third embodiment;

FIG. 8 is a diagram for explaining a back light control of the third embodiment;

FIG. 11 is a flowchart showing operation of the projection display apparatus 100 of the fourth embodiment; and FIG. 12 is a schematic view showing a configuration of a projection display apparatus 100 of a fifth embodiment.

DETAILED DESCRIPTION OF THE PREFERRED EMBODIMENTS

Figure 1:
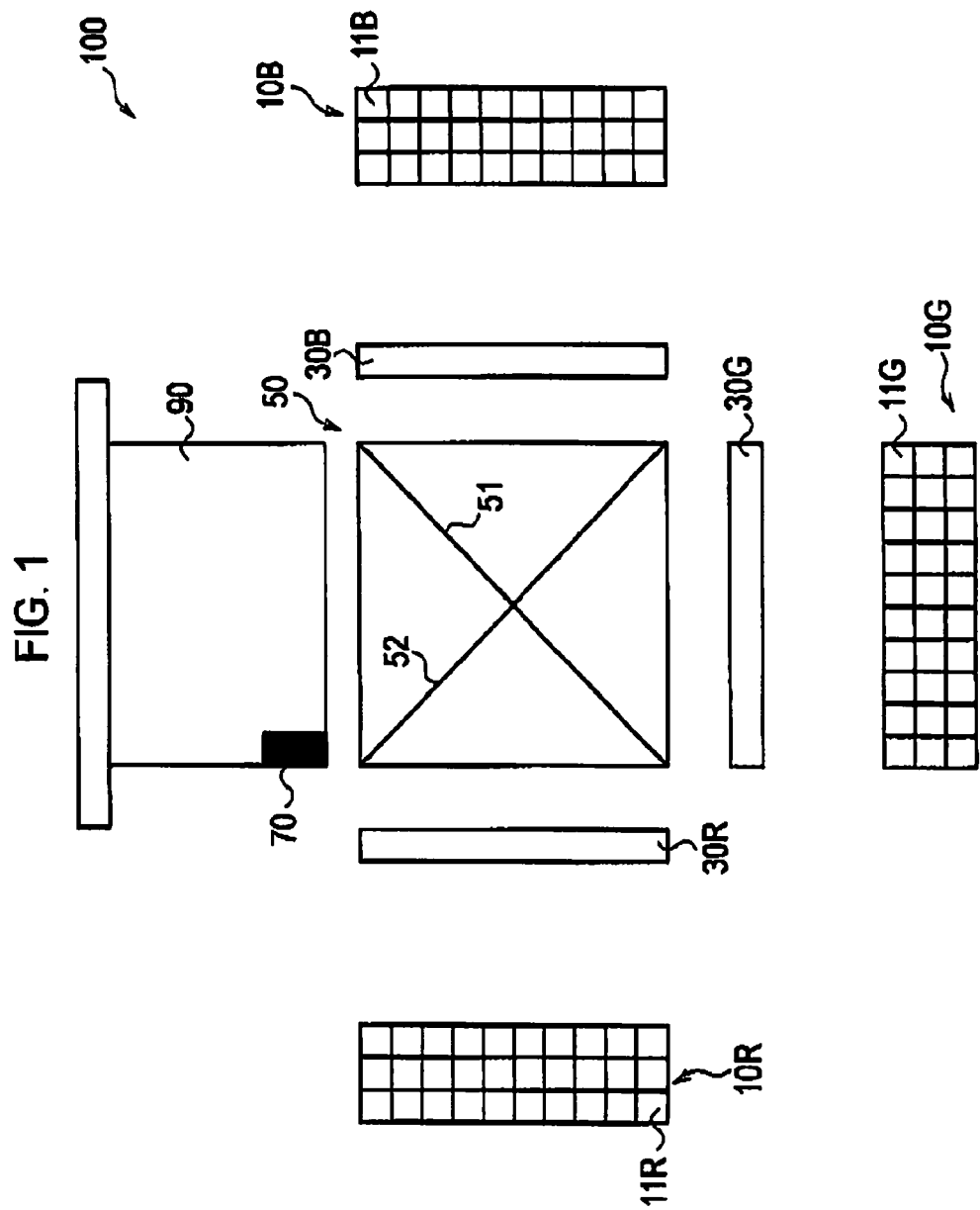
FIG. 1 is a schematic view showing a configuration of a projection display apparatus 100 of a first embodiment.

Hereinafter, description will be given of a projection display apparatus according to embodiments of the present invention with reference to the accompanying drawings. Note that, the same or similar reference numerals are given for the same or similar parts in the following drawings.

It should be further noted that the drawings are schematic, each of the sizes, ratios and the like is thus different from actual ones. For this reason, specific size and the like should be determined by the following description. Further, there is obviously a part different in size or ratio from another among the drawings.

First Embodiment (Configuration of a Projection Display Apparatus)

A configuration of a projection display apparatus according to a first embodiment will be described below with reference to the accompanying drawings. FIG. 1 is a schematic view showing a configuration of a projection display apparatus 100 of a first embodiment.

As shown in FIG. 1, the projection display apparatus 100 includes: array light sources 10 (an array light source 10R, an array light-source 10G, and an array light source 10B) in which plurality of solid state light sources 11 (solid state light sources 11R, solid state light sources 11G, and solid state light sources 11B) are disposed in an array; light valves 80 (a light valve 30R, a light valve 30G, and a light valve 30B); a cross dichroic prism 50; and a projection lens unit 90 provided with a light amount sensor 70 is provided.

Meanwhile, it should be noted that an optical element (for example, a taper rod or a fly eye lens), which uniformizes light emitted from the array light source 10, and the like are omitted in FIG. 1 for the sake of simplicity.

In the array light source 10R, the plurality of solid state light sources 11R, which emits red component light, are disposed in an array. The solid state light source 11R is a solid state light source such as an LED or an LD.

Similarly, in the array light source 100, the plurality of solid state light sources 11G, which omits green component light, are disposed in an array. The solid state light source 11G is a solid state light source such as an LED or an LD. Further, in the array light source 10B, the plurality of solid state light sources 11B, which emits blue component light, are disposed in an array. The solid state light source 11B is a solid state light source such as an LED or an LD.

Incidentally, the disposition of the solid state light sources 11 in the array light source 10 is not limited to be of rectangular shape. For example, the disposition of the solid state light sources 11 in the array light source 10 may be of X-shape, cross-shape, circular shape, or of any other shape.

The light valve 80R is an optical element (for example, a transmissive liquid crystal panel) which modulates red component light emitted from the array light source 10R.

Similarly the light valve BOG is an optical element (for example, a transmissive liquid crystal panel) which modulates green component light emitted from the array light source 10G. Further, the light valve 30B is an optical element (for example, a transmissive liquid crystal panel) which modulates blue component light emitted from the array light source 10R.

Note that, the light valve 30 is not limited to a transmissive liquid crystal panel. For example, the light valve 30 may be a reflective liquid crystal panel, or a DMD (Digital Micromirror Device).

The cross dichroic prism 50 is a color combination unit configured to combine respective color component lights emitted from the light valves 30R, 30G, and 30B. To be more precise, the cross dichroic prism 50 includes a dichroic film 51, which reflects red component emitted from the light valve 30R and transmits green component light emitted from the light valve 30G, and a dichroic film 52, which reflects blue component emitted from the light valve 30B and transmits green component light emitted from the light valve 30G.

Meanwhile, a combined light combined by the cross dichroic prism 50 is guided into the projection unit 90 provided with the light amount sensor 70 is provided.

The light amount sensor 70 is provided on a light path of the combined light combined by the cross dichroic prism 50. The light amount sensor 70 detects an amount of the combined light combined by the cross dichroic prism 50. The light amount sensor 70 may be disposed at any location where the light amount sensor 70 may detect the combined light combined by the cross dichroic prism 50.

Incidentally, it is preferable that the light amount sensor 70 be disposed outside of an effective range of use for the combined light combined by the cross dichroic prism 50. The effective range of use is a range of the combined light to be projected by the projection lens unit 90. Accordingly, the outside of the effective range represents a portion (so-called an over scanner) which is not projected by the projection lens unit 90.

The projection lens unit 90 projects combined light combined by the cross dichroic prism 50 on a screen (not shown). In this way, image is displayed on the screen.

(Configuration of a Control Unit)

Figure 2:
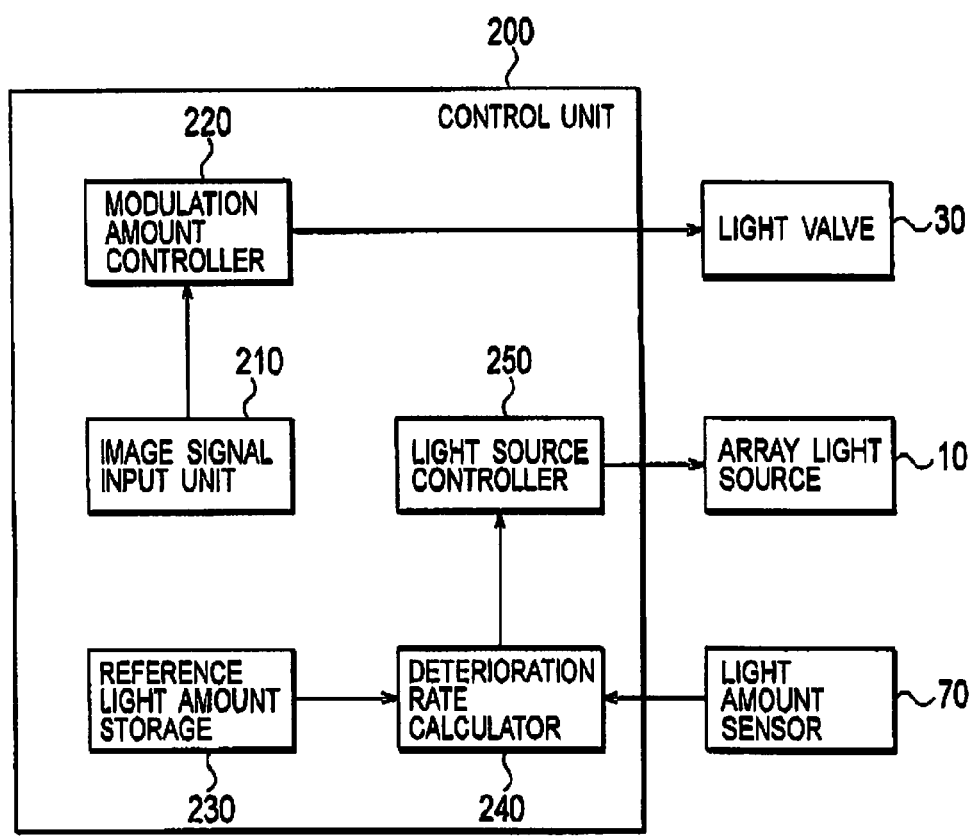
FIG. 2 is a block diagram showing a configuration of a control unit 200 of the first embodiment.

A configuration of a control unit according to the first embodiment will be described below with reference to the accompanying drawings. FIG. 2 is a block diagram showing a configuration of a control unit 200 of the first embodiment.

As shown in FIG. 2, the control unit 200 includes an image signal input unit 210, a modulation amount controller 220, a reference light amount storage 230, a deterioration rate calculator 240, and a light source controller 250.

The image signal input unit 210 acquires an image input signal, including a red input signal R, a green input signal G, and a blue input signal B, from an external device (for example, a personal computer, a DVD player, a TV tuner, or the like). The image signal input unit 210 inputs the image input signal in the modulation amount controller 220.

In response to the image input signal acquired from the image signal input unit 210, the modulation amount controller 220 controls the respective light valves 30 (a light valve 30R, a light valve 30G, and a light valve 30B).

The reference light amount storage 230 stores a reference amount of light (a reference value) for each of the solid state light sources 11 provided to the corresponding array light sources 10.

Here, the reference amount of light is an amount of light (a rated amount of light, or the like) required for the solid state light sources 11 at the initial phase at which no deterioration or the like occurs in the solid state light sources 11. For example, the reference amount of light is an amount of light emitted from the solid state light sources 11, in the case where a maximum current is supplied to the solid state light sources 11.

Incidentally, the reference amount of light may be an amount of light detected by the above-mentioned light amount sensor 70 in the case where each of the solid state light sources 11 are individually turned on at the time of factory shipment or the like.

The deterioration rate calculator 240 acquires an amount of light of a measurement target light source, which is one of the amounts of light emitted from the plurality of solid state light sources 11, from amounts of light detected by the light amount sensor 70.

To be more specific, assuming that the solid state light sources 11 are sequentially turned on one by one, the deterioration rate calculator 240 acquires a difference between an amount of light ($L_t$) which is detected by the light amount sensor 70 at time t, and an amount of light ($L_{t+1}$) which is detected by the light amount sensor 70 at time t+1. Obviously, a measurement target light source is the solid state light source 11 which is to be newly turned on at the time t+1.

Meanwhile, assuming that the solid state light sources 11 are sequentially turned off one by one, the deterioration rate calculator 240 acquires a difference between an amount of light ($L_t$) which is detected by the light amount sensor 70 at time t, and an amount of light ($L_{t+1}$) which is detected by the light amount sensor 70 at time t+1. Obviously, a measurement target light source is the solid state light source 11 which is to be newly turned off at the time t+1.

It should be noted here that the deterioration rate calculator 240 acquires the amount of light of a measurement target light source so as to compare the amount of light of the measurement target light source with a reference amount of light of the measurement target light source stored in the reference light amount storage 230.

For example, in the case where the reference amount of light of the measurement target light source is a actual amount of light required for the measurement target light source, the deterioration rate calculator 240 modifies the difference between the amount of light ($L_t$) and the amount of light ($L_{t+1}$), and acquires (estimates) the actual amount of light of the measurement target light source. This is because not all the light emitted from the measurement target light source can reach the light amount sensor 70.

In the meantime, in the case where the reference amount of light of the measurement target light source is an amount of light to be detected by the light amount sensor 70, it is not necessary to modify the amount of light to be detected by the light amount sensor 70. Thus, the deterioration rate calculator 240 acquires the difference between the amount of light ($L_t$) and the amount of light ($L_{t+1}$) as it is as the amount of light of the measurement target light source.

Subsequently, the deterioration rate calculator 240 compares the amount of light (the acquired amount of light) of the measurement target light source acquired from the amount of light detected by the light amount sensor 70, with the reference amount of light of the measurement target light source stored in the reference light amount storage 230. In this way, the deterioration rate calculator 240 calculates a rate of the acquired amount of light to the reference amount of light, that is, a deterioration rate (1−(acquired amount of light/reference amount of light)) of the measurement target light source.

The light source controller 250 controls an amount of light emitted from the plurality of solid state light sources 11, for each of the solid state light sources 11. To be more precise, the light source controller 250 sequentially turns on the solid state light sources 11 one by one in the turn-on phase in which the projection display apparatus 100 is turned on and the array light sources 10 are turned on. Meanwhile, the light source controller 250 sequentially turns off the solid state light sources 11 one by one in the turn-off phase in which the projection display apparatus 100 is turned off and the array light sources 10 are turned off.

Further, depending on the deterioration rate of the solid state light source 11 calculated by the deterioration rate calculator 240, the light source controller 250 controls the amount of light of the solid state light source 11. Specifically, to correct the deterioration of the solid state light source 11, the light source controller 250 increases an amount of current supplied to the solid state light source 11, in accordance with the deterioration rate of the solid state light source 11. For example, when the deterioration rate of the solid state light source 11 is 10%, the light source controller 250 sets the amount of current supplied to the solid state light source 11 to approximately 1.1 times larger.

(Operation of Projection Display Apparatus)

Figure 3:
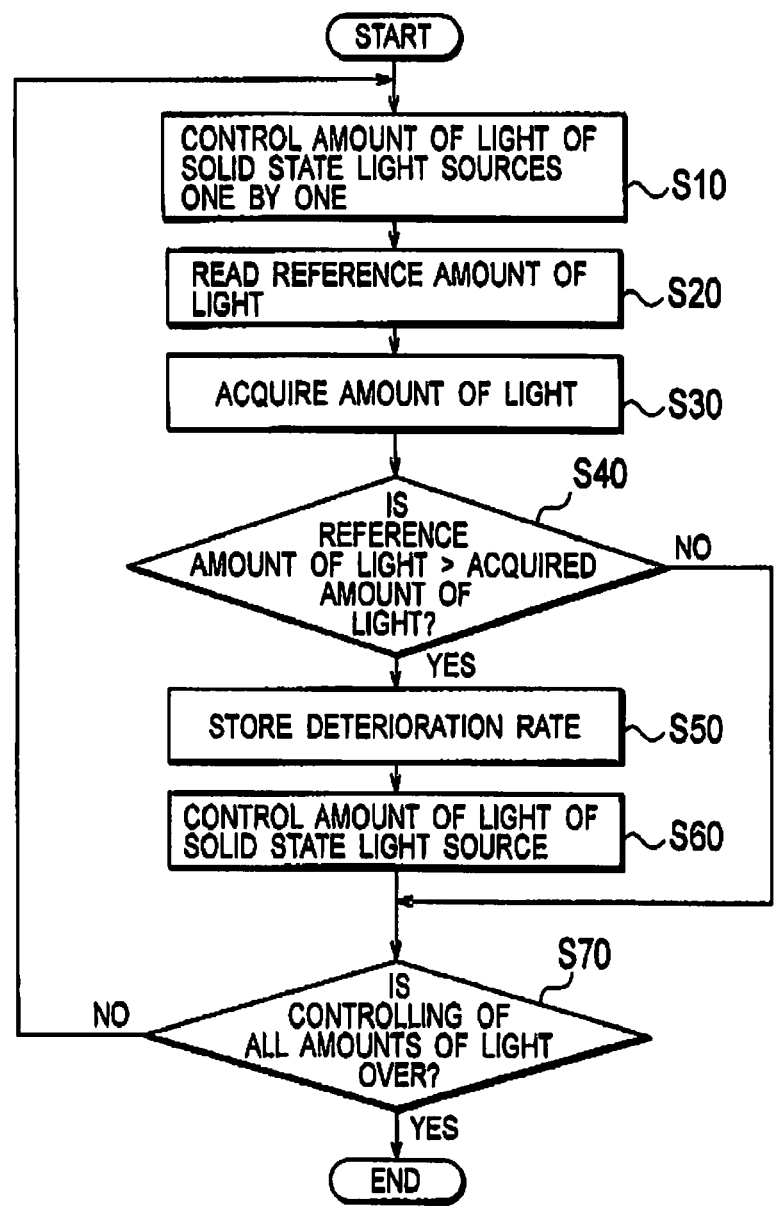
FIG. 3 is a flowchart showing operation of the projection display apparatus 100 of the first embodiment.
Figure 4:
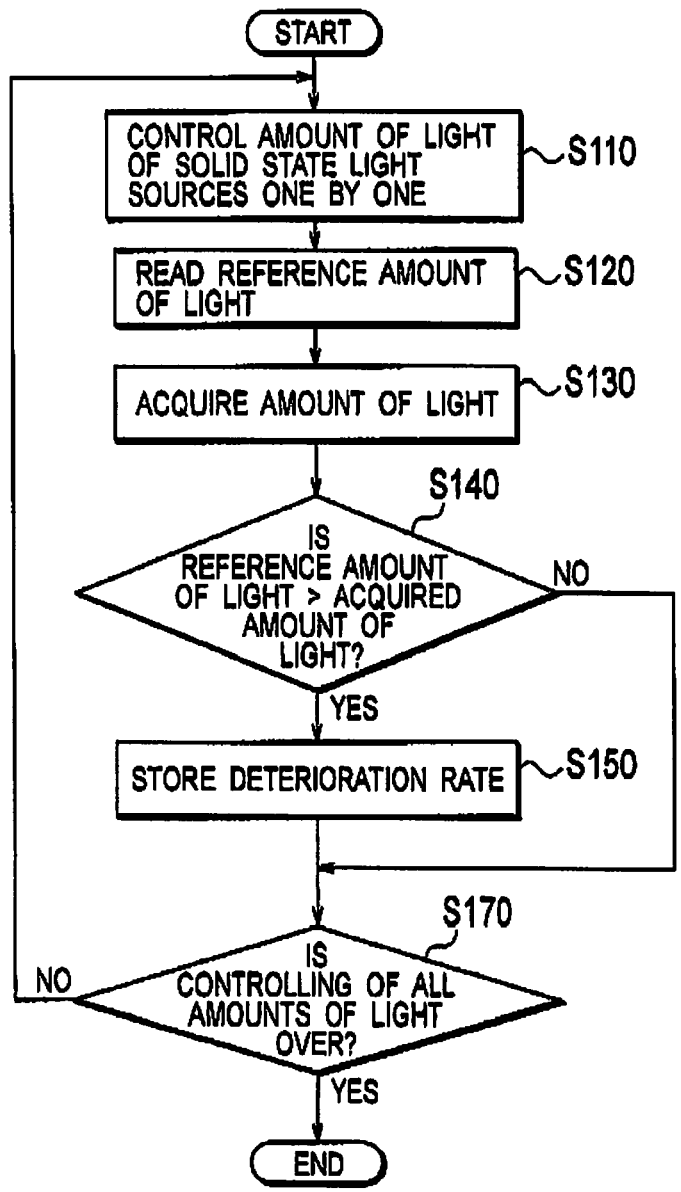
FIG. 4 is a flowchart showing operation of the projection display apparatus 100 of the first embodiment.

The operation of the projection display apparatus according to the first embodiment will be described below with reference to the accompanying drawings. FIGS. 3 and 4 are flowcharts each of which shows operation of the projection display apparatus 100 of the first embodiment.

First, the operation of the projection display apparatus 100 in the turn-on phase will be described with reference to FIG. 3.

As shown in FIG. 3, the projection display apparatus 100 turns on one of the solid state light sources 11 in Step 10.

In Step 20, the projection display apparatus 100 reads, from the reference light amount storage 230, the reference amount of light of the solid state light source 11 which is turned on in Step 10 (the measurement target light source).

In Step 30, the projection display apparatus 100 acquires an amount of light of the measurement target light source from an amount of light detected by the light amount sensor 70. To be more precise, the projection display apparatus 100 acquires a difference between an amount of light ($L_t$) detected by the light amount sensor 70 at time t, and an amount of light ($L_{t+1}$) detected by the light amount sensor 70 at time t+1.

In Step 40, the projection display apparatus 100 compares the reference amount of light read out in Step 20, with the amount of fight (the acquired amount of light) acquired in Step 80. When the detected amount of light is less than the reference amount of light, the projection display apparatus 100 moves to a process of Step 50; and when the detected amount of light is not less than the reference amount of light, the projection display apparatus 100 moves to a process of Step 70.

In Step 50, the projection display apparatus 100 calculates a rate of the acquired amount of light to the reference amount of light (that is, a deterioration rate). Subsequently, the projection display apparatus 100 stores the deterioration rate by linking the deterioration rate to the solid state light source 11 via the identifier of the solid state light source 11.

In Step 60, the projection display apparatus 100 controls the amount of light of the solid state light source 11 in accordance with the deterioration rate calculated in Step 50. Specifically, to correct the deterioration of the solid state light source 11, the projection display apparatus 100 increases an amount of current to be supplied to the solid state light source 11, in accordance with the deterioration rate of the solid state light source 11.

Incidentally, the light amount sensor 70 detects the amount of light of the solid state light source 11 controlled in Step 60. The amount of light detected by the light amount sensor 70 is used in Step 30 in the next loop. Specifically, the amount of light detected by the light amount sensor 70 is used as the amount of light ($L_t$) to be detected by the light amount sensor 70 at time t.

In Step 70, the projection display apparatus 100 determines whether or not all the solid state light sources 11 provided to the array light source 10 have already been turned on. In the case where all the solid state light sources 11 have already been turned on, the projection display apparatus 100 terminates a series of processes, and in the case where not all the solid state light sources 11 have been turned on, the projection display apparatus 100 goes back to a process in Step 10.

Next, the operation of the projection display apparatus 100 in the turn-off phase will be described with reference to FIG. 4.

As shown in FIG. 4, in Step 110, the projection display apparatus 100 turns off one of the solid state light sources 11.

In Step 120, the projection display apparatus 100 reads, from the reference light amount storage 230, the reference amount of light of the solid state light source 11 which is turned off in Step 110 (the measurement target light source).

In Step 180, the projection display apparatus 100 acquires an amount of light of the measurement target light source from an amount of light detected by the light amount sensor 70. More specifically, the projection display apparatus 100 acquires a difference between an amount of light ($L_t$) detected by the light amount sensor 70 at time t, and an amount of light ($L_{t+1}$) detected by the light amount sensor 70 at time t+1.

In Step 140, the projection display apparatus 100 compares the reference amount of light road out in Step 120, with the amount of light (the acquired amount of light) acquired in Step 130. When the detected amount of light is less than the reference amount of light, the projection display apparatus 100 moves to a process of Step 150; and when the detected amount of light is not less than the reference amount of light, the projection display apparatus 100 moves to a process of Step 170.

In Step 150, the projection display apparatus 100 calculates a rate of the acquired amount of light to the reference amount of light (that is, a deterioration rate). Subsequently, the projection display apparatus 100 stores the deterioration rate by linking the deterioration rate to the solid state light source 11 via the identifier of the solid state light source 11.

It should be noted that, the deterioration rate stored in Step 150 is used for the next start-up of the projection display apparatus 100.

In Step 170, the projection display apparatus 100 determines whether or not all the solid state light sources 11 provided to the array light source 10 have already been turned off. In the case where all the solid state light sources 11 have already been turned off, the projection display apparatus 100 terminates a series of processes, and in the case where not all the solid state light sources 11 have been turned off, the projection display apparatus 100 goes back to a process in Step 110.

(Operation and Effect)

According to the projection display apparatus 100 of the first embodiment, at a turn-on phase, the light source controller 250 sequentially turns on the solid state light source 11 one by one. Accordingly, by providing only a single light amount sensor 70 without providing light amount sensors to each of the plurality of solid state light sources 11, the deterioration rate of a single solid state light source 11 (a measurement target light source) can be calculated.

In the same manner, the light source controller 250 sequentially turns off the solid state light sources 11 one by one at a turn-on phase. Accordingly, by providing only a single light amount sensor 70 without providing light amount sensors to each of the plurality of solid state light sources 11, the deterioration rate of a single solid state light source 11 (a measurement target light source) can be calculated.

As a result, even when the plurality of solid state light sources 11 are disposed in an array, variation of the amount of light emitted from each of the solid state light sources 11 can be suppressed using the deterioration rate calculated for each of the solid state light sources 11.

Second Embodiment

A second embodiment of the present invention will be described below with reference to the accompanying drawings. In the following description, different points between the above-mentioned first embodiment and the second embodiment will be mainly described.

In the first embodiment described above, it is not considered that an amount of light of the solid state light source 11 detected by the light amount sensor 70 is different in accordance with the disposition of the solid state light source 11. In the second embodiment, by contrast, it is considered that the amount of light of the solid state light source 11 detected by the light amount sensor 70 is different in accordance with the disposition of the solid state light source 11.

(Configuration of a Control Unit)

Figure 5:
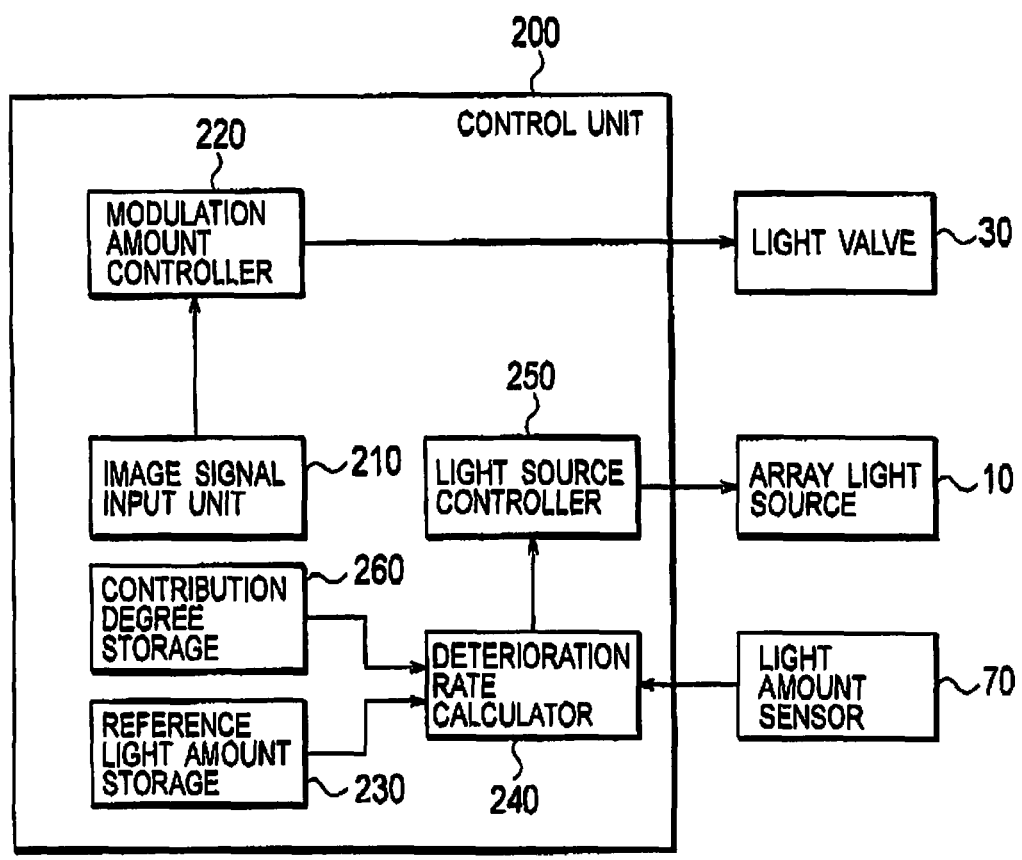
FIG. 5 is a block diagram showing a configuration of a control unit 200 of a second embodiment.

A configuration of a control unit according to the second embodiment will be described below with reference to the accompanying drawings. FIG. 5 is a block diagram showing a configuration of a control unit 200 of the second embodiment. It should be noted that in FIG. 6, constituent elements which are the same as those shown in FIG. 2 are given the same reference numerals.

Figure 6:
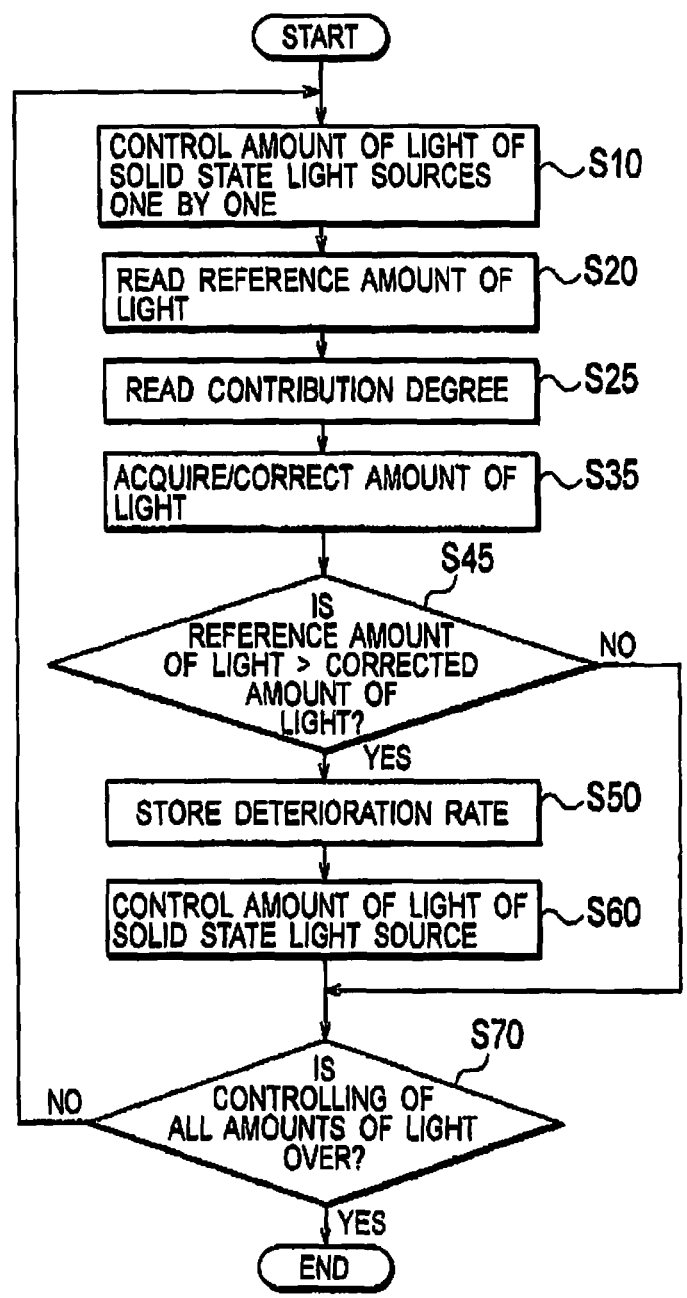
FIG. 6 is a flowchart showing operation of a projection display apparatus 100 of the second embodiment.

As shown in FIG. 6, the control unit 200 further includes a contribution degree storage 260 in addition to the constituent elements shown in FIG. 2.

The contribution degree storage 260 stores a contribution degree for each of the solid state light sources 11. The contribution degree, in other words, is the degree of light reaching the light amount sensor 70, the light emitted from each of the plurality of solid state light sources 11. It should be noted that the contribution degree is different, depending on the disposition of the solid state light source 11 in the array light source 10.

Here, when the deterioration rate of a measurement target light source is calculated by the deterioration rate calculator 240, the contribution degree of the measurement target light source stored in the contribution degree storage 260 is considered.

Specifically, the deterioration rate calculator 240 corrects an amount of light of the measurement target light source, acquired from an amount of light detected by the light amount sensor 70, in accordance with the contribution degree of the measurement target light source.

Subsequently, the deterioration rate calculator 240 compares an amount of light of the measurement target light source corrected in accordance with the contribution degree (a corrected amount of light), with a reference amount of light of the measurement target light source stored in the reference light amount storage 230. In this way, the deterioration rate calculator 240 calculates a rate of the corrected amount of light to the reference amount of light, that is, a deterioration rate of the measurement target light source (1−(corrected amount of light/reference amount of light)).

Incidentally, the deterioration rate calculator 240 may correct the reference amount of light of the measurement target light source stored in the reference light amount storage 230 in accordance with the contribution degree of the measurement target light source.

In this case, the deterioration rate calculator 240 compares an amount of light of the measurement target light source acquired from an amount of light detected by the light amount sensor 70 (an acquired amount of light), with a reference amount of light of the measurement target light source corrected in accordance with the contribution degree (a corrected reference amount of light). In this way, the deterioration rate calculator 240 calculates a rate of the acquired amount of light to the corrected reference amount of light, that is, a deterioration rate of the measurement target light source ({1−(acquired amount of light/corrected reference amount of light)}={1−(corrected amount of light/reference amount of light)}).

(Operation of a Projection Display Apparatus)

The operation of a projection display apparatus according to the second embodiment will be described below with reference to the accompanying drawings. FIG. 6 is a flowchart showing operation of a projection display apparatus 100 of the second embodiment. It should be noted that in FIG. 6, processes which are the same as those shown in FIG. 3 are given the same step numerals.

As shown in FIG. 6, in Step 25, the projection display apparatus 100 reads a contribution degree from the contribution degree storage 260 for the solid state light source 11 which is turned on in Step 10 (a measurement target light source).

In Step 36, the projection display apparatus 100 acquires an amount of light of the measurement target light source from an amount of light detected by the light amount sensor 70. To be more precise, the projection display apparatus 100 acquires a difference between an amount of light ($L_t$) which is detected by the light amount sensor 70 at time t, and an amount of light ($L_{t+1}$) which is detected by the light amount sensor 70 at time t+1.

Subsequently, the projection display apparatus 100 corrects an amount of light of the measurement target light source acquired from an amount of light detected by the light amount sensor 70, in accordance with the contribution degree of the measurement target light source.

In Step 45, the projection display apparatus 100 compares the reference amount of light read in Step 20, with the amount of light corrected in Step 35 (the corrected amount of light. When the corrected amount of light is less than the reference amount of light, the projection display apparatus 100 moves to a process of Step 50, and when the corrected amount of light is not less than the reference amount of light, the projection display apparatus 100 moves to a process of Step 70.

Incidentally, in the second embodiment, although the case where the contribution degree is considered in the turn-on phase, the contribution degree may also naturally be considered in the turn-off phase.

(Operation and Effect)

According to the projection display apparatus 100 of the second embodiment, the light source controller 250 calculates the deterioration rate of the solid state light source 11 (a measurement target light source) with allowing for the disposition of each of the solid state light sources 11 in the array light source 10. Thus, the calculation accuracy of the deterioration rate of the solid state light source 11 (the measurement target light source) is improved.

Third Embodiment

A third embodiment of the present invention will be described below with reference to the accompanying drawings. In the following description, different points between the above-mentioned first embodiment and the third embodiment will be mainly described.

In the first embodiment described above, a deterioration rate of a measurement target light source is calculated in the turn-on phase and the turn-off phase. In the third embodiment, in the meantime, the deterioration rate of the measurement target light source is calculated in a back light control in which an amount of light of the array light source 10 is switched in response to an image input signal.

(Configuration of a Control Unit)

A configuration of a control unit according to the third embodiment will be described below with reference to the accompanying drawings. FIG. 7 is a block diagram showing a configuration of a control unit 200 of the third embodiment. It should be noted that in FIG. 7, constituent elements which are the same as those shown in FIG. 2 are given the same reference numerals.

As shown in FIG. 7, the light source controller 250 acquires an image input signal, including a red input signal R, a green input signal G, and a blue input signal B, from the image signal input unit 210.

The light source controller 250 performs a back light control in which an amount of light of the array light source 10 is switched in response to the image input signal.

To be more precise, as shown in FIG. 8, the light source controller 260 obtains a histogram of frequency of each luminance value with respect to the image input signal included in one frame. Subsequently, the light source controller 250 calculates a target luminance (a target amount of light) for the amount of light of the array light source 10 using the histogram.

The target luminance for the amount of light of the array light source 10 includes an intermediate luminance value between a minimum luminance ($L_{MIN}$) and a maximum luminance ($L_{MAX}$) (a target luminance 1), a mean luminance value of image input signals included in one frame (a target luminance 2), a luminance value including lower 95% of image input signals included in one frame (a target luminance 3), and the like.

The light source controller 250 controls the amount of light of the solid state light sources 11 provided to the array light source 10 so that the amount of light of the array light source 10 becomes the target luminance (a target amount of light). The light source controller 250 sequentially controls the solid state light source 11 one by one in the back light control, as in the first embodiment.

Here, the light source controller 250 outputs an amount of control of a measurement target light source, which is one of the plurality of solid state light sources 11, to the deterioration rate calculator 240.

The deterioration rate calculator 240 corrects the amount of light of the measurement target light source acquired from the amount of light detected by the light amount sensor 70, in accordance with the amount of control of the measurement target light source. For example, when the amount of control of the measurement target light source is an increase by 10% or a decrease by 10%, the amount of light of the measurement target light source acquired from the amount of light detected by the light amount sensor 70 is multiplied by an inverse of the amount of control (1/0.1=10).

Subsequently, the deterioration rate calculator 240 compares the amount of light corrected in accordance with the amount of control of the measurement target light source (a corrected amount of light), with a reference amount of light stored in the reference light amount storage 230. In this way, the deterioration rate calculator 240 calculates a rate of the corrected amount of light to the reference amount of light, that is, a deterioration rate of the measurement target light source (1−(corrected amount of light/reference amount of light)).

Meanwhile, the light source controller 250 outputs a correction instruction signal, which instructs a correction of the image input signal, to the modulation amount controller 220. This correction instruction signal includes a rate of the maximum luminance to the target luminance (a maximum luminance/a target luminance).

The modulation amount controller 220 corrects the image input signal in response to the correction instruction signal, and controls an amount of modulation of the light valve 30. To be more precise, the modulation amount controller 220 multiplies a rate included in the correction instruction signal and the image input signal so as to calculate the amount of modulation of the light valve 80.

With such a back light control, luminance of an image displayed on a screen is maintained to some extent, even when an amount of light of the array light source 10 is changed.

In this regard, however, a correction of the image input signal cannot be performed in excess of the maximum value of the image input signal. Accordingly, in the case where an amount of light of the array light source 10 is reduced in a back light control, an image to be displayed on a screen has a limit on a luminance with respect to a pixel in which the luminance of an image input signal before being corrected is above a predetermined value, no matter how the image input signal is corrected.

(Operation of a Projection Display Apparatus)

Figure 9:
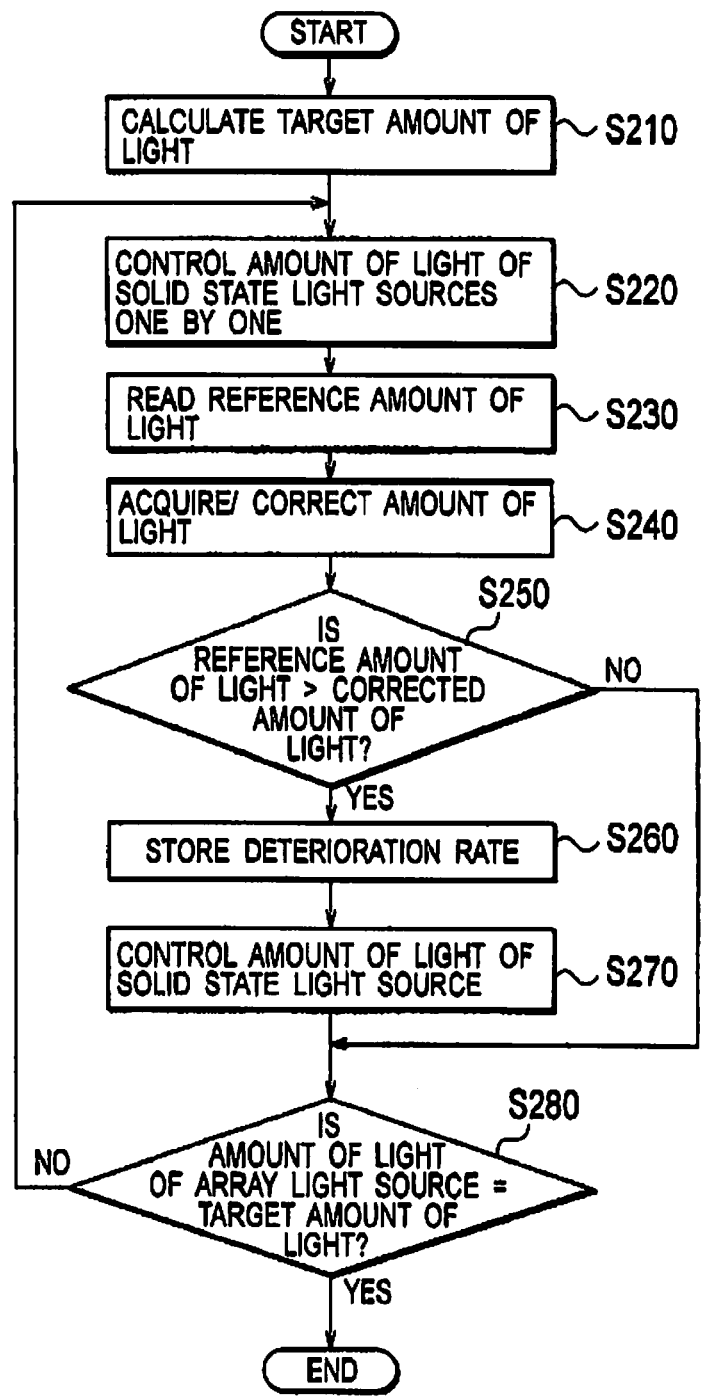
FIG. 9 is a flowchart showing operation of a projection display apparatus 100 of the third embodiment.

The operation of a projection display apparatus according to the third embodiment will be described below with reference to the accompanying drawings. FIG. 9 is a flowchart showing operation of a projection display apparatus 100 of the third embodiment.

As shown in FIG. 9, in Step 210, the projection display apparatus 100 calculates a target luminance (a target amount of light) based on an image input signal.

In Step 220, the projection display apparatus 100 turns on one of the solid state light sources 11 so that an amount of light of the array light source 10 is approximated to the target luminance.

In Step 220, the projection display apparatus 100 reads a reference amount of light of the solid state light source 11 (a measurement target light source) controlled in Step 220, from the reference light amount storage 230.

In Step 240, the projection display apparatus 100 acquires an amount of light of the measurement target light source from an amount of light detected by the light amount sensor 70. To be more precise, the projection display apparatus 100 acquires a difference between an amount of light ($L_t$) which is detected by the light amount sensor 70 at time t, and an amount of light ($L_{t+1}$) which is detected by the light amount sensor 70 at time t+1.

Subsequently, the projection display apparatus 100 corrects the amount of light acquired from the amount of light detected by the light amount sensor 70 using the amount of control of the measurement target light source in Step 220.

In Step 250, the projection display apparatus 100 compares the reference amount of light read out in Step 230, with an amount of light corrected (a corrected amount of light) in Step 240. When the corrected amount of light is less than the reference amount of light, the projection display apparatus 100 moves to a process of Step 260; and when the corrected amount of light is not less than the reference amount of light, the projection display apparatus 100 moves to a process of Step 280.

In Step 260, the projection display apparatus 100 calculates a rate (that is, a deterioration rate) of the acquired amount of light to the reference amount of light. Subsequently, the projection display apparatus 100 stores the deterioration rate by linking the deterioration rate to the solid state light source 11 via the identifier of the solid state light source 11.

In Step 270, the projection display apparatus 100 controls the amount of light of the solid state light source 11 in accordance with the deterioration rate calculated in Step 260. To be more precise, to correct the deterioration of the solid state light source 11, the projection display apparatus 100 increases an amount of current to be supplied to the solid state light source 11 based on the deterioration rate of the solid state light source 11.

Incidentally, the light amount sensor 70 detects the amount of light of the solid state light source 11 controlled in Step 270. The amount of light detected by the light amount sensor 70 is used in Step 240 in the next loop. Specifically, the amount of light detected by the light amount sensor 70 is used as the amount of light ($L_t$) to be detected by the light amount sensor 70 at time t.

In Step 280, the projection display apparatus 100 determines whether or not the amount of light of the array light source 10 has reached the target amount of light. When the amount of light of the array light source 10 has reached the target amount of light, the projection display apparatus 100 terminates a series of processes, and when the amount of light of the array light source 10 has not reached the target amount of light, the projection display apparatus 100 goes back to a process of Step 220.

(Operation and Effect)

According to the projection display apparatus 100 of the third embodiment, the light source controller 250 sequentially controls the solid state light source 11 one by one while a back light control is performed. Accordingly, by providing only a single light amount sensor 70 without providing light amount sensors to each of the plurality of solid state light sources 11, the deterioration rate of a single solid state light source 11 (a measurement target light source) can be calculated.

As a result, even when the plurality of solid state light sources 11 are disposed in an array, variation of the amount of light emitted from each of the solid state light sources 11 can be suppressed using the deterioration rate calculated for each of the solid state light sources 11.

Moreover, an amount of current to be supplied to the solid state light source 11 is controlled while the deterioration rate of the solid state light source 11 (the measurement target light source) is calculated in real time. Accordingly, variation of the amount of light emitted from each of the solid state light sources 11 can be suppressed in real time.

Here, when considering the case where the solid state light source 11 is a laser, a deterioration of the laser is likely to happen due to a change in ambient temperature. In reaction to this phenomenon, it is determined whether or not the laser deteriorates when a back light control is performed, that is, when an image is actually displayed. With this process, the deterioration of the laser due to the change in ambient temperature can also be detected. Thus, the third embodiment is particularly effective in the case where the solid state light source 11 is a laser.

Fourth Embodiment

A fourth embodiment of the present invention will be described below with reference to the accompanying drawings. In the following description, different points between the above-mentioned third embodiment and the fourth embodiment will be mainly described.

In the third embodiment described above, it is not considered that an amount of light of the solid state light source 11 detected by the light amount sensor 70 is different in accordance with the disposition of the solid state light source 11. In the fourth embodiment, by contrast, it is considered that the amount of light of the solid state light source 11 detected by the light amount sensor 70 is different in accordance with the disposition of the solid state light source 11.

In other words, the fourth embodiment is an embodiment obtained by applying the second embodiment to the third embodiment.

(Configuration of a Control Unit)

Figure 10:
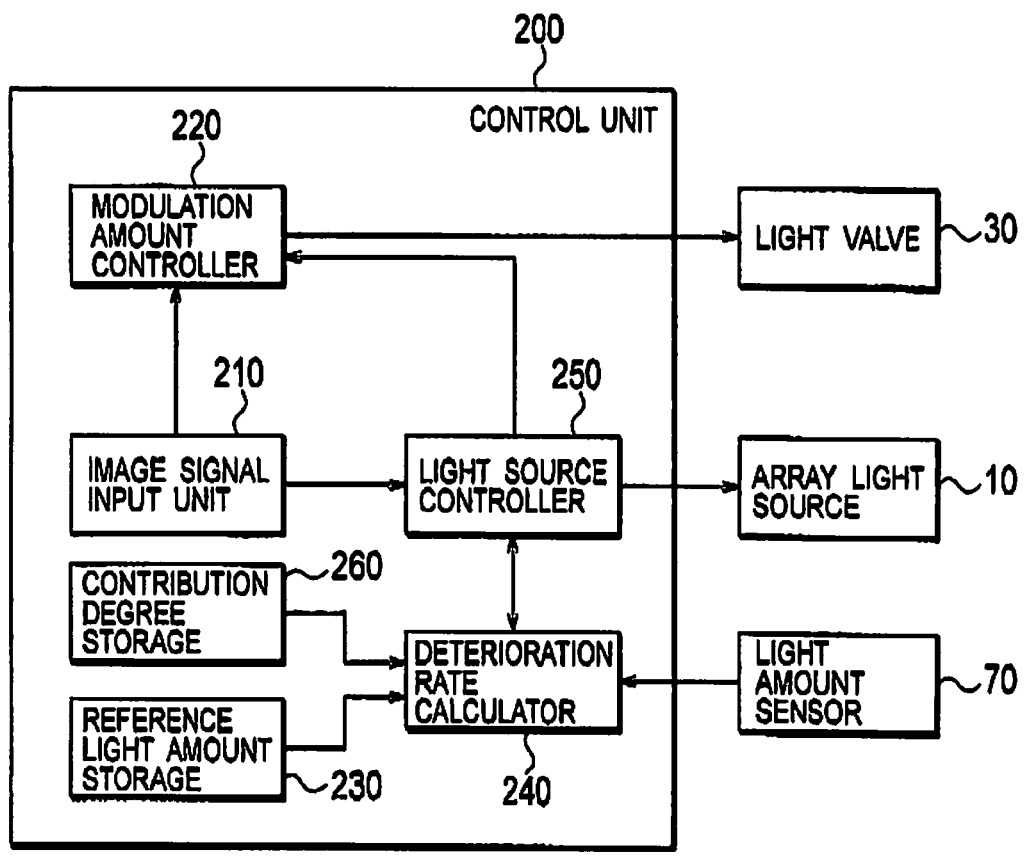
FIG. 10 is a block diagram showing a configuration of a control unit 200 of a fourth embodiment.

A configuration of a control unit according to the fourth embodiment will be described below with reference to the accompanying drawings. FIG. 10 is a block diagram showing a configuration of a control unit 200 of the fourth embodiment. It should be noted that in FIG. 10, constituent elements which are the same as those shown in FIG. 7 are given the same reference numerals.

As shown in FIG. 10, the control unit 200 further includes a contribution degree storage 260 in addition to the constituent elements shown in FIG. 7.

The contribution degree storage 260, as in the second embodiment, stores a contribution degree for each of the solid state light sources 11. The contribution degree, in other words, is the degree of light reaching the light amount sensor 70, the light emitted from each of the plurality of solid state light sources 11.

As in the second embodiment, when the deterioration rate of a measurement target light source is calculated by the deterioration rate calculator 240, the contribution degree of the measurement target light source stored in the contribution degree storage 260 is considered.

(Operation of a Projection Display Apparatus)

The operation of a projection display apparatus according to the fourth embodiment will be described below with reference to the accompanying drawings. FIG. 11 is a flowchart showing operation of a projection display apparatus 100 of the fourth embodiment. It should be noted that in FIG. 11, processes which are the same as those shown in FIG. 9 are given the same step numerals.

As shown in FIG. 11, in Stop 285, the projection display apparatus 100 reads a contribution degree from the contribution degree storage 260 for the solid state light source 11 which is controlled in Step 220 (a measurement target light source).

In Step 245, the projection display apparatus 100 acquires an amount of light of the measurement target light source from an amount of light detected by the light amount sensor 70. To be more precise, the projection display apparatus 100 acquires a difference between an amount of light ($L_t$) which is detected by the light amount sensor 70 at time t, and an amount of light ($L_{t+1}$) which is detected by the light amount sensor 70 at time t+1.

Subsequently, the projection display apparatus 100 corrects an amount of light of the measurement target light source acquired from an amount of light detected by the light amount sensor 70, in accordance with the amount of control of the measurement target light source and the contribution degree of the measurement target light source.

In Step 255, the projection display apparatus 100 compares a reference amount of light read in Step 230, with an amount of light corrected in Step 246 (a corrected amount of light). When the corrected amount of light is less than the reference amount of light, the projection display apparatus 100 moves to a process of Step 260, and when the corrected amount of light is not less than the reference amount of light, the projection display apparatus 100 moves to a process of Step 280.

(Operation and Effect)

According to the projection display apparatus 100 of the fourth embodiment, the light source controller 250 calculates the deterioration rate of the solid state light source 11 (the measurement target light source) with allowing for the disposition of each of the solid state light sources 11 in the array light source 10. Thus, the calculation accuracy of the deterioration rate of the solid state light source 11 (the measurement target light source) is improved.

Fifth Embodiment

A fifth embodiment of the present invention will be described below with reference to the accompanying drawings. In the following description, different points between the above-mentioned first embodiment and the fifth embodiment will be mainly described.

To be more precise, in the first embodiment described above, the light amount sensor 70 is provided to the projection lens unit 90. Meanwhile, in the fifth embodiment, the light amount sensor 70 is provided to the cross dichroic prism 50.
(Configuration of a Projection Display Apparatus)

The configuration of a projection display apparatus according to the fifth embodiment will be described below with reference to the accompanying drawings. FIG. 12 is a schematic view showing a configuration of a projection display apparatus 100 of the fifth embodiment. It should be noted that in FIG. 12, constituent elements which are the same as those shown in FIG. 1 are given the same reference numerals.

As shown in FIG. 12, the light amount sensor 70 is provided to the cross dichroic prism 50. Incidentally, it is preferable that as in the first embodiment, the light amount sensor 70 be disposed outside of an effective range of use for combined light combined by the cross dichroic prism 50.

Other Embodiment

The present invention has been set forth in the above-described embodiments. However, it should not be understood that the discussion and the drawings constituting part of this disclosure are interpreted to limit the present invention. Based on this disclosure, various kinds of alternative embodiments, examples, and practical techniques should be achieved by those skilled in the art.

For example, in the above described embodiments, the light source controller 250 sequentially controls the amount of light of the solid state light sources 11 one by one in the turn-on phase, the turn-off phase and in the back light control. However, the method of controlling the amount of light of the solid state light sources 11 is not limited to what has been described above. Specifically, it is only necessary for the light source controller 250 to control the amount of light of the solid state light sources 11 so that the deterioration rate calculator 240 is able to acquire a single measurement target light source. For example, after turning on three of the solid state light sources 11, the light source controller 250 may turn off two of the solid state light sources 11.

In the above-described embodiments, the light amount sensor 70 detects an amount of light of a combined light obtained by combining a red component light, a green component light and a blue component light. However, the method of detecting the amount of light it not limited to what has been described above. To be more precise, the light amount sensor 70 may be configured to individually detect a red component light, a green component light, and a blue component light. In this case, the light source controller 250 may simultaneously control the solid state light sources 11R provided to the array light source 10R, the solid state light sources 11G provided to the array light source 100, and the solid state light sources 11B provided to the array light source 10B.

In the above embodiments, the light amount sensor 70 is provided to the cross diohroic prism 50, or to the projection lens unit 90, but the disposition is not limited to the above one. To be more precise, the light amount sensor 70 may be provided to an over scan portion of a screen on which an image is projected.

In the above embodiments, the single light amount sensor 70 is provided, but the number of the light amount sensors 70 is not limited to one.

To be more precise, the light amount sensor 70 may be provided to each of the array light sources 10 (the array light source 10R, the array light source 10G, and the array light source 10B). In this case, each of the light amount sensors 70 is provided on a light path of light emitted from corresponding one of the array light sources 10.

While not particularly described in the above embodiments, a back light control may be performed on the array light sources. 10 (the array light source 10R, the array light source 10G, and the array light source 10B) in common, or may be performed on each of the array light sources 10 (the array light source 10R, the array light source 10G, and the array light source 10B) individually.

While not particularly described in the above embodiments, by informing a user of a solid state light source 11 the deterioration rate of which has exceeded a predetermined value, the user may be encouraged to exchange this solid state light source 11.

While not particularly described in the above embodiments, at the time of starting a back light control, the light source controller 250 stores a position of a solid state light source 11 of which the amount of light is firstly controlled, as a start position. Further, at the time of terminating the back light control, the light source controller 250 updates the start position, in accordance with a terminate position of a solid state light source 11 of which the amount of light is lastly controlled.

As a result, the deterioration rates of all the solid state light sources 11 provided to the array light sources 10 are calculated. Especially, even when the amounts of light of all the solid state light sources 11 provided to the array light sources 10 is not controlled in one back light control, the deterioration rates of all the solid state light sources 11 are calculated.

While not particularly described in the above embodiments, in a back light control in which the amount of light of the array light source 10 is reduced, the light source controller 250 controls a solid state light source 11, the deterioration rate of which is large, prior to a solid state light source 11, the deterioration rate of which is small. Meanwhile, in a back light control in which the amount of light of the array light source 10 is increased, the light source controller 250 controls a solid state light source 11, the deterioration rate of which is small, prior to a solid state light source 11, the deterioration rate of which is large.

Here, a larger amount of current is supplied to the solid state light source 11 the deterioration rate of which is large, than to the solid state light source 11 the deterioration rate of which is small. In reaction to this phenomenon, the rate of use of the solid state light source 11, the deterioration rate of which is large, is suppressed. In this way, power consumption can be reduced.

While not particularly described in the above embodiments, when an image corresponding to an image signal is dark, the light source controller 250 can reduce the amount of light of the array light source 10 so that the drive current of a solid state light source 11, the deterioration rate of which is large, can be reduced. However, it should be particularly noted that in the initial adjustment (turn-on phase), since the amount of the array light source 10 is made maximum, the drive current of a solid state light source 11, the deterioration rate of which is large, should not be reduced.

While not particularly described in the above embodiments, it is preferable that an optical element (a fly-eye lens or a taper rod), which uniformizes light emitted from the array light source 10, be provided. Using this, light emitted from all the solid state light sources 11 constituting the array light source 10 securely reaches the light amount sensor 70, so that deterioration in the solid state light sources 11 can be securely detected.

In the above embodiments, after acquiring an amount of light of a measurement target light source in response to the turning-on or the turning-off of a solid state light source 11, the deterioration rate calculator 240 calculates the deterioration rate of the measurement target light source; however, the method of calculation is not limited to this. To be more precise, the deterioration rate calculator 240 may acquire the amount of light of the measurement target light source by controlling the amount of light of the solid state light sources 11 in sequence.

For example, in the turn-on phase, after turning on all of the solid state light sources 11 constituting the array light sources 10, the amount of light of the measurement target light source may be acquired by being reduced by several percentages. Thus, after a user is recognized that all the solid state light sources 11 have been turned on, the deterioration rate of the measurement target light source can be calculated by reducing the amount of light of the measurement target light source so that the user does not perceive the reduction.

Further, in the turn-off phase, after turning off all of the solid state light sources 11 constituting the array light sources 10, the amount of light of the measurement target light source may be acquired by being increased by several percentages. Thus, after a user is recognized that all the solid state light sources 11 have been turned off, the deterioration rate of the measurement target light source can be calculated by increasing the amount of light of the measurement target light source 80 that the user does not perceive the increase.

What is claimed is:

1. A projection display apparatus provided with an array light source in which a plurality of solid state light sources that emit light of the same color are disposed in an array, comprising:
    a sensor provided on a light path of light emitted from the array light source, and configured to detect an amount of light emitted from the plurality of solid state light sources that emit light of the same color;
    an acquisition unit configured to acquire an amount of light of a measurement target light source which is any one of the plurality of solid state light sources that emit light of the same color, based on the difference between the amount of light detected by the sensor at time t and the amount of light detected by the sensor at time t+1;
    a reference light amount storage configured to store a reference amount of light of an amount of light emitted from each of the plurality of solid state light sources;
    a light source controller configured to control the amount of light emitted from each of the plurality of solid state light sources and wherein the solid state light sources are controlled sequentially one by one in a period in which lights of the same color are to be emitted, so that the acquisition unit acquires the amount of light of the measurement target light source; and
    a determination unit configured to determine whether or not the measurement target light source has deteriorated, in accordance with a result of a comparison between the amount of light of the measurement target light source acquired by the acquisition unit, and the reference amount of light, wherein
    the light source controller sequentially controls the amounts of light of the respective solid state light sources one by one, in a turn-off phase where the emission of the light from the array light source is terminated by turning off the projection display apparatus, and
    the acquisition unit acquires the amount of light of the measurement target light source, in accordance with the amount of light detected by the sensor in the turn-off phase.

2. The projection display apparatus according to claim 1, further comprising:
    a contribution degree storage configured to store a contribution degree which is a degree of light reaching the sensor, emitted from each of the plurality of solid state light sources; and
    a correction unit configured to correct the amount of light of the measurement target light source acquired by the acquisition unit, or the reference amount of light, based on the contribution degree corresponding to the measurement target light source, wherein
    the determination unit determines whether or not the measurement target light source has deteriorated, using a result of correction made by the correction unit.

3. The projection display apparatus according to claim 2, wherein
    the light source controller sequentially controls the amounts of light of the respective solid state light sources one by one, in a turn-on phase turning on the array light source, and
    the acquisition unit acquires the amount of light of the measurement target light source, in accordance with the amount of light detected by the sensor in the turn-on phase.

4. A projection display apparatus provided with an array light source in which a plurality of solid state light sources that emit light of the same color are disposed in an array, comprising:
    a sensor provided on a light path of light emitted from the array light source, and configured to detect an amount of light emitted from the plurality of solid state light sources that emit light of the same color;
    an acquisition unit configured to acquire an amount of light of a measurement target light source which is any one of the plurality of solid state light sources that emit light of the same color, based on the difference between the amount of light detected by the sensor at time t and the amount of light detected by the sensor at time t+1;
    a reference light amount storage configured to store a reference amount of light of an amount of light emitted from each of the plurality of solid state light sources;
    a light source controller configured to control the amount of light emitted from each of the plurality of solid state light sources and wherein the solid state light sources are controlled sequentially one by one in a period in which lights of the same color are to be emitted, so that the acquisition unit acquires the amount of light of the measurement target light source; and
    a determination unit configured to determine whether or not the measurement target light source has deteriorated, in accordance with a result of a comparison between the amount of light of the measurement target light source acquired by the acquisition unit, and the reference amount of light, wherein the light source controller sequentially controls the amounts of light of the respective solid state light sources one by one, in a back light control switching the amount of light of the array light source in accordance with an image signal, and the acquisition unit acquires the amount of light of the measurement target light source in accordance with the amount of light detected by the sensor in the back light control.

5. The projection display apparatus according to claim 4, further comprising:
   a contribution degree storage configured to store a contribution degree which is a degree of light reaching the sensor, emitted from each of the plurality of solid state light sources; and
   a correction unit configured to correct the amount of light of the measurement target light source acquired by the acquisition unit, or the reference amount of light, based on the contribution degree corresponding to the measurement target light source, wherein
   the determination unit determines whether or not the measurement target light source has deteriorated, using a result of correction made by the correction unit.

6. The projection display apparatus according to claim 4, wherein
   the light source controller sequentially controls the amounts of light of the respective solid state light sources one by one, in a turn-on phase turning on the array light source, and
   the acquisition unit acquires the amount of light of the measurement target light source, in accordance with the amount of light detected by the sensor in the turn-on phase.

7. The projection display apparatus according to claim 4, further comprising:
   a start position storage configured to store a start position which is a position of the solid state light source of which an amount of light is controlled at a time of starting the back light control; and
   a start position updating unit configured to update the start position, in accordance with a terminate position which is the position of the solid state light source of which an amount of light is controlled at a time of terminating the back light control.

8. The projection display apparatus according to claim 4, further comprising
   a calculation unit configured to calculate a deterioration rate of the measurement target light source in accordance with the result of the comparison between the amount of light of the measurement target light source acquired by the acquisition unit, and the reference amount of light, wherein
   the light source controller controls the amount of light of the solid state light source having a large deterioration rate, prior to the solid state light source having a small deterioration rate, in the back light control reducing the amount of light of the array light source.

9. The projection display apparatus according to claim 8, wherein
   the light source controller controls the amount of light of the solid state light source having a small deterioration rate, prior to the solid state light source having a large deterioration rate, in the back light control increasing the amount of light of the array light source is increased.

* * * * *